(12) United States Patent
Song

(10) Patent No.: US 11,167,719 B2
(45) Date of Patent: Nov. 9, 2021

(54) ADVANCED FOUR-POINT SEAT BELT AND VEHICLE INCLUDING THE SAME

(71) Applicants: HYUNDAI MOTOR COMPANY, Seoul (KR); KIA MOTORS CORPORATION, Seoul (KR)

(72) Inventor: Yong-Woon Song, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 232 days.

(21) Appl. No.: 16/658,367

(22) Filed: Oct. 21, 2019

(65) Prior Publication Data
US 2020/0180554 A1 Jun. 11, 2020

(30) Foreign Application Priority Data
Dec. 5, 2018 (KR) .................... 10-2018-0154869

(51) Int. Cl.
*B60R 22/20* (2006.01)
*B60R 22/03* (2006.01)
*B60R 22/26* (2006.01)
*B60R 22/34* (2006.01)
*B60R 21/013* (2006.01)
*B60R 21/01* (2006.01)

(52) U.S. Cl.
CPC .......... *B60R 22/20* (2013.01); *B60R 21/013* (2013.01); *B60R 22/03* (2013.01); *B60R 22/26* (2013.01); *B60R 22/34* (2013.01); *B60R 2021/01034* (2013.01); *B60R 2021/01265* (2013.01)

(58) Field of Classification Search
CPC ......... B60R 22/03; B60R 22/20; B60R 22/34; B60R 2021/01034; B60R 2021/01265; B60R 2022/027
See application file for complete search history.

(56) References Cited

U.S. PATENT DOCUMENTS

| 5,123,673 | A | * | 6/1992 | Tame | ............... B60R 22/03 100/268 |
| 5,806,891 | A | * | 9/1998 | Pokhis | ............... B60R 22/02 280/801.1 |
| 6,655,744 | B2 | * | 12/2003 | Petri | ............... A44B 11/2511 297/478 |
| 2004/0036270 | A1 | * | 2/2004 | Roychoudhury | ....... B60R 22/02 280/802 |

(Continued)

FOREIGN PATENT DOCUMENTS

| DE | 102014010364 A1 * | 1/2016 | ......... A61F 13/5515 |
| DE | 102018109796 B3 * | 7/2019 | ............. B60R 21/18 |

(Continued)

*Primary Examiner* — Barry Gooden, Jr.
(74) *Attorney, Agent, or Firm* — Lempia Summerfield Katz LLC

(57) ABSTRACT

An advanced four-point seat belt may include: a three-point seat belt to diagonally hold a passenger with a webbing; and a motorized seat belt to allow a tongue of the webbing to maintain a state of being fixed to a side surface of a seat cushion to an initial position. In particular, when a vehicle collision situation is recognized, the motorized seat belt forms an "X" shape webbing confinement state by withdrawing the webbing and another webbing to locate the tongue at a central position of a body of the passenger.

19 Claims, 8 Drawing Sheets

(56) References Cited

U.S. PATENT DOCUMENTS

| | | | |
|---|---|---|---|
| 2009/0322067 A1* | 12/2009 | Nezaki | B60R 22/26 |
| | | | 280/807 |
| 2011/0062698 A1* | 3/2011 | Xu | B60R 22/46 |
| | | | 280/806 |
| 2013/0009391 A1* | 1/2013 | Miller | B60R 21/18 |
| | | | 280/806 |
| 2017/0028965 A1* | 2/2017 | Ohno | B60R 22/26 |
| 2019/0217754 A1* | 7/2019 | Fu | B60N 2/433 |
| 2020/0180555 A1* | 6/2020 | Kim | B60R 22/3405 |

FOREIGN PATENT DOCUMENTS

| | | | | |
|---|---|---|---|---|
| DE | 102018251773 A1 | * | 7/2020 | B60R 22/03 |
| FR | 3066456 B1 | * | 11/2019 | B60W 50/00 |
| GB | 2395465 A | * | 5/2004 | B60R 22/02 |
| GB | 2407537 A | * | 5/2005 | B60R 22/24 |
| GB | 2408241 A | * | 5/2005 | B60R 21/18 |
| GB | 2414442 A | * | 11/2005 | B60R 22/26 |
| KR | 20130119682 A | * | 11/2013 | B60R 22/18 |
| KR | 10-1553328 B1 | | 9/2015 | |
| WO | WO-2004101330 A1 | * | 11/2004 | B60R 22/023 |
| WO | WO-2004101331 A1 | * | 11/2004 | B60R 22/321 |
| WO | WO-2013162212 A1 | * | 10/2013 | B60R 22/18 |
| WO | WO-2018050667 A1 | * | 3/2018 | B60R 22/02 |

\* cited by examiner

ADVANCED FOUR-POINT SEAT BELT AND VEHICLE INCLUDING THE SAME

CROSS-REFERENCE TO RELATED APPLICATION

This application claims priority to and the benefit of Korean Patent Application No. 10-2018-0154869, filed on Dec. 5, 2018, the entire contents of which are incorporated herein by reference.

FIELD

Exemplary forms of the present disclosure relate to a four-point seat belt to improve safety and convenience.

BACKGROUND

The statements in this section merely provide background information related to the present disclosure and may not constitute prior art.

In general, a four-point seat belt of a vehicle improves performance of holding a passenger so as to meet collision performance required in a new car assessment program (NCAP).

For example, since a two-point seat belt or a three-point seat belt can support only a one-side chest region of a passenger, when a vehicle is collided, a body of the passenger is turned to one side and thus a passenger's shoulder is dislocated or a movement of the body thereof increases, thereby causing an injury such as bumping of a head of the passenger against a windshield. In particular, when a child having a small body size is aboard, the two-point seat belt or the three-point seat belt may cause a terrible accident.

In order to solve the above-described problems, a four-point seat belt is constituted of a combination of two-point seat belts or three-point seat belts to surround a chest of a passenger in an "X" shape (or form) and thus, when a vehicle is collided, the four-point seat belt safely holds a body of the passenger sitting on a front seat at both sides of the body to prevent a forward lurch of the body due to inertial force, thereby preventing an accident involved in safety.

In particular, the four-point seat belt is becoming more important because the four-point seat belt is capable of protecting a passenger in various postures in an autonomous vehicle allowing the passenger to select various posture modes such as a "relax mode," "working mode," and "lounge mode."

In recent years, however, with NCAP (regulations of North America) at the head, four-point seat belt regulations in which "a seat belt wearing is possible with one hand at a time" are required in collision safety regulations of each country (e.g., ECE R-16 (Europe) and FMVSS 208, 209 (USA)).

Consequently, it is desired to improve the existing four-point seat belt. For example, this is because the existing four-point seat belt requires a first action of right-hand insertion in a webbing, a second action of left-hand insertion in the webbing, a third action of engagement of a seat belt using two hands, or a first action of engagement of a three-point seat belt and a second operation of engagement of a suspender-type webbing.

SUMMARY

The present disclosure is directed to an advanced four-point seat belt capable of meeting strengthened regulations of a four-point seat belt by allowing the four-point seat belt to be worn with one hand at a time, and particularly, not requiring an additional engagement operation of a user because, after a three-point seat belt is engaged by operation at once, engagement switching of the four-point seat belt is made by a buckle movement due to power of a motor immediately before collision, and a vehicle including the same.

Other objects and advantages of the present disclosure can be understood by the following description and become apparent with reference to the forms of the present disclosure. Also, it is obvious to those skilled in the art to which the present disclosure pertains that the objects and advantages of the present disclosure can be realized by the means as claimed and combinations thereof.

In one form of the present disclosure, an advanced four-point seat belt includes: a three-point seat belt configured to diagonally hold a passenger with a webbing from one side of a seat, and a motorized seat belt configured to allow a tongue of the webbing to maintain a state of being fixed to a side surface of a seat cushion to an initial position from the other side of the seat. In particular, when a vehicle collision situation is recognized, to the motorized seat forms an "X" shape webbing confinement state by withdrawing the webbing and another webbing to locate the tongue at a central position of a body of the passenger.

The motorized seat belt may include, in a state in which the tongue is connected, a four-point belt switching device configured to withdraw the webbing to allow the tongue to be located at the central portion of the body of the passenger, a retractor configured to wind the webbing, and a swiveling upper anchor configured to support the webbing.

The four-point belt switching device may include a moving buckle connected to the tongue, and a telescopic guider configured to generate a telescopic movement for allowing the moving buckle to move upward or downward with respect to the passenger.

A web ring configured to support the webbing of the motorized seat belt may be provided at the moving buckle. The telescopic guider may include a frame configured to convert the telescopic movement into a reciprocal movement, a wire configured to generate the reciprocal movement of the frame by being wound or released, and a motor configured to form the winding and the release of the wire in a rotational direction.

A roller shaft may be provided at the frame to reduce friction due to the reciprocal movement. The frame may include a frame group constituted of a plurality of frames so as to be unfolded in the reciprocal movement in a state of being superposed on each other. The wire may include an unfolding wire and a folding wire and, when the motor rotates, the unfolding wire and the folding wire may be respectively released and wound in opposite directions.

The swiveling upper anchor may be fixed to an upper portion of the seat and may generate a rotation so as to not confine a movement due to a withdrawal or insertion of the webbing. The retractor may be fixed to a lower portion of the seat.

The motorized seat belt may be controlled by a belt controller, and the belt controller may recognize the vehicle collision situation in conjunction with an airbag controller.

In the three-point seat belt, a support anchor configured to support the webbing may be engaged with a vehicle body panel.

In accordance with another form of the present disclosure, there is provided a vehicle including an advanced four-point seat belt, wherein the advanced four-point seat belt having a three-point seat belt with a webbing configured to diagonally hold a passenger, and, when a vehicle collision situation is recognized, a motorized seat belt configured to withdraw the webbing and another webbing to switch to an "X" shape webbing confinement state by locating a tongue of the webbing located below the passenger to a central portion of a body of the passenger, a seat at which the motorized seat belt is located at a position of a seat opposite the three-point seat belt, and a vehicle body panel with which a support anchor configured to support the webbing of the three-point seat belt is engaged.

The motorized seat belt may be controlled by a belt controller to be switched to the "X" shape webbing confinement state. The belt controller may receive a recognition signal for the vehicle collision situation from an airbag controller to operate the motorized seat belt.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
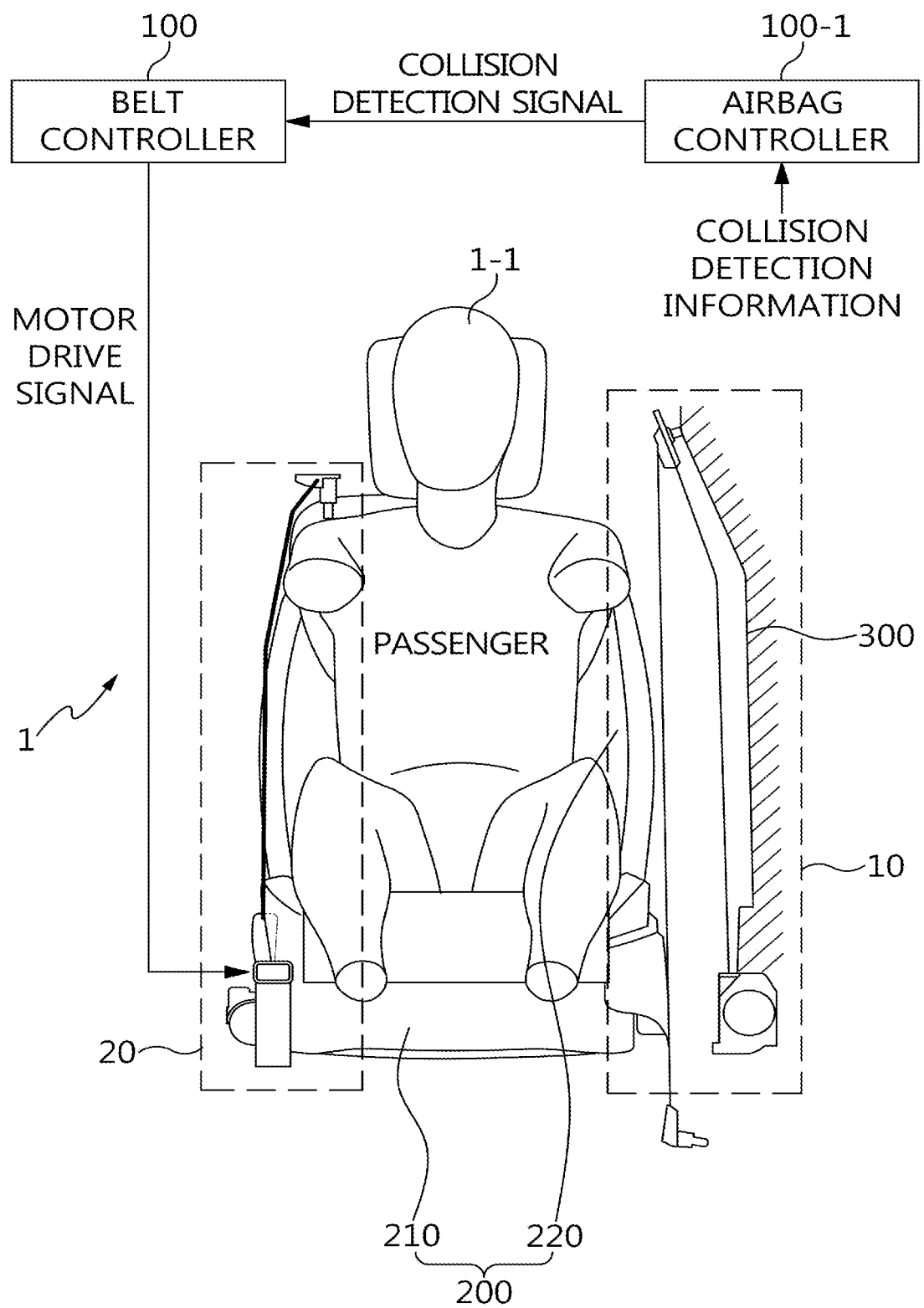
FIG. 1 is a block diagram of an advanced four-point seat belt applied to a vehicle in one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Exemplary forms of the present disclosure may be embodied in various other different forms by those skilled in the art to which the present disclosure pertains so that the present disclosure is not limited to these forms.

Referring to FIG. 1, an advanced four-point seat belt 1 applied to a vehicle includes a three-point seat belt 10 for holding a passenger 1-1, and a motorized seat belt 20 for holding the passenger 1-1.

Further, the advanced four-point seat belt 1 applied to the vehicle may include a belt controller 100 for controlling the motorized seat belt 20. In this case, the belt controller 100 is interlocked with an airbag controller 100-1, and the airbag controller 100-1 recognizes a vehicle collision situation before a collision to provide a collision risk signal to the belt controller 100. Therefore, the belt controller 100 operates the motorized seat belt 20 before a collision such that the passenger 1-1 wearing only the three-point seat belt 10 may be protected in the "X" shape (or form) through the motorized seat belt 20 without a manual operation.

As described above, the four-point seat belt 1 is characterized as an advanced four-point seat belt by combining the three-point seat belt 10 for which a user manipulation is made for usually protecting a passenger with the motorized seat belt 20 in which an automatic manipulation is made for protecting the passenger at risk of collision.

Figure 2:
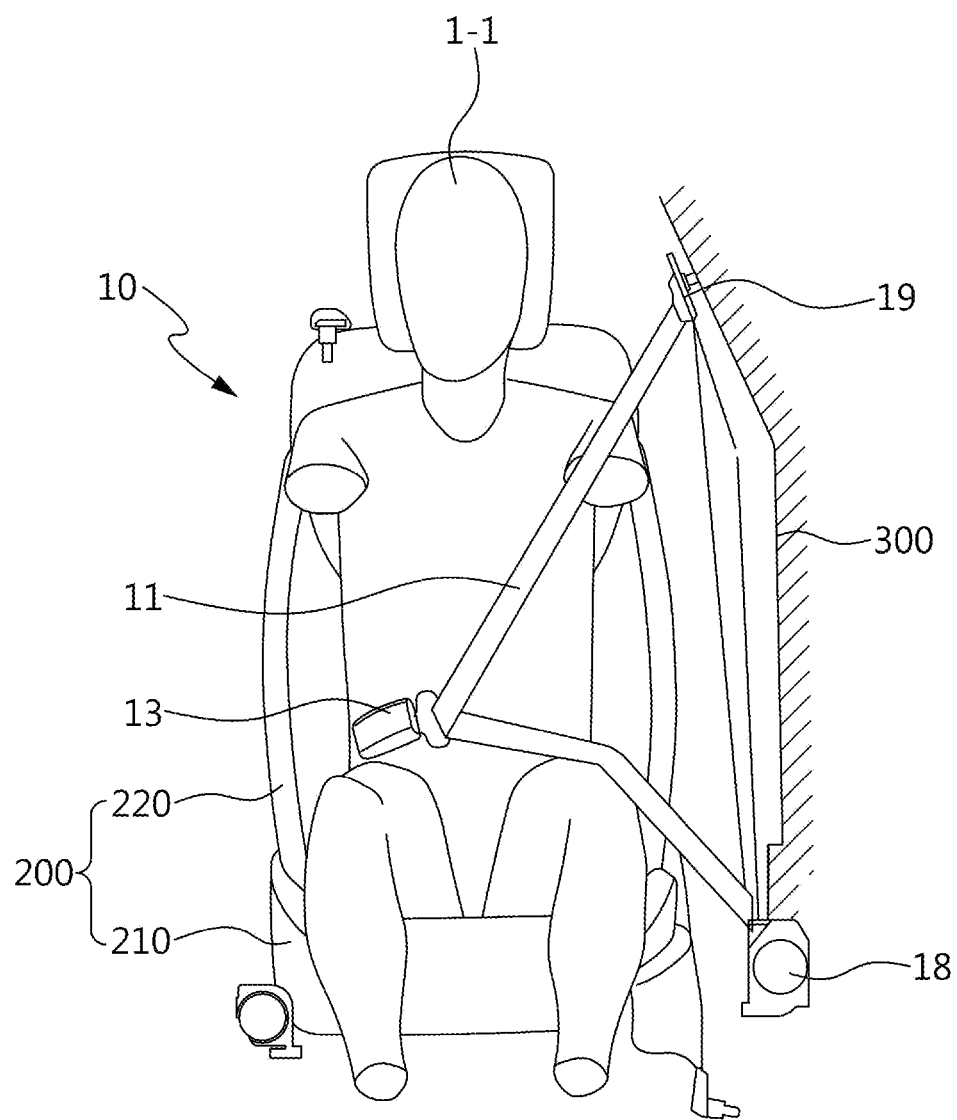
FIG. 2 is a configurational diagram of a three-point seat belt constituting the advanced four-point seat belt in one form of the present disclosure.

Referring to FIG. 2, the three-point seat belt 10 includes a webbing 11, a tongue 13, a retractor 18, and a support anchor 19.

For example, the webbing 11 diagonally holds a chest region from a left side of the passenger 1-1. The webbing 11 is formed in a strip made of a fabric and is wound around the retractor 18. The tongue 13 is provided at an end of the webbing 11 and is coupled to a buckle (i.e., a moving buckle 22-1 of a four-point belt switching device 22 of FIG. 3) to fix the webbing 11. The retractor 18 winds the webbing 11 with which the tongue 13 is separated from the buckle with a spring restoring force, whereas the retractor 18 allows the webbing 11 to be withdrawn when the webbing 11 is pulled so as to engage the tongue 13 with the buckle. The support anchor 19 has a bracket to be engaged with a vehicle body panel 300 (e.g., a B-pillar panel portion on a side surface of the vehicle) via bolts or pins. The support anchor 19 has a ring for hanging and supporting the webbing 11 while allowing the webbing 11 to pass through the ring.

Therefore, the webbing 11, the tongue 13, the retractor 18, and the support anchor 19 are components of a conventional three-point seat belt.

Figure 3:
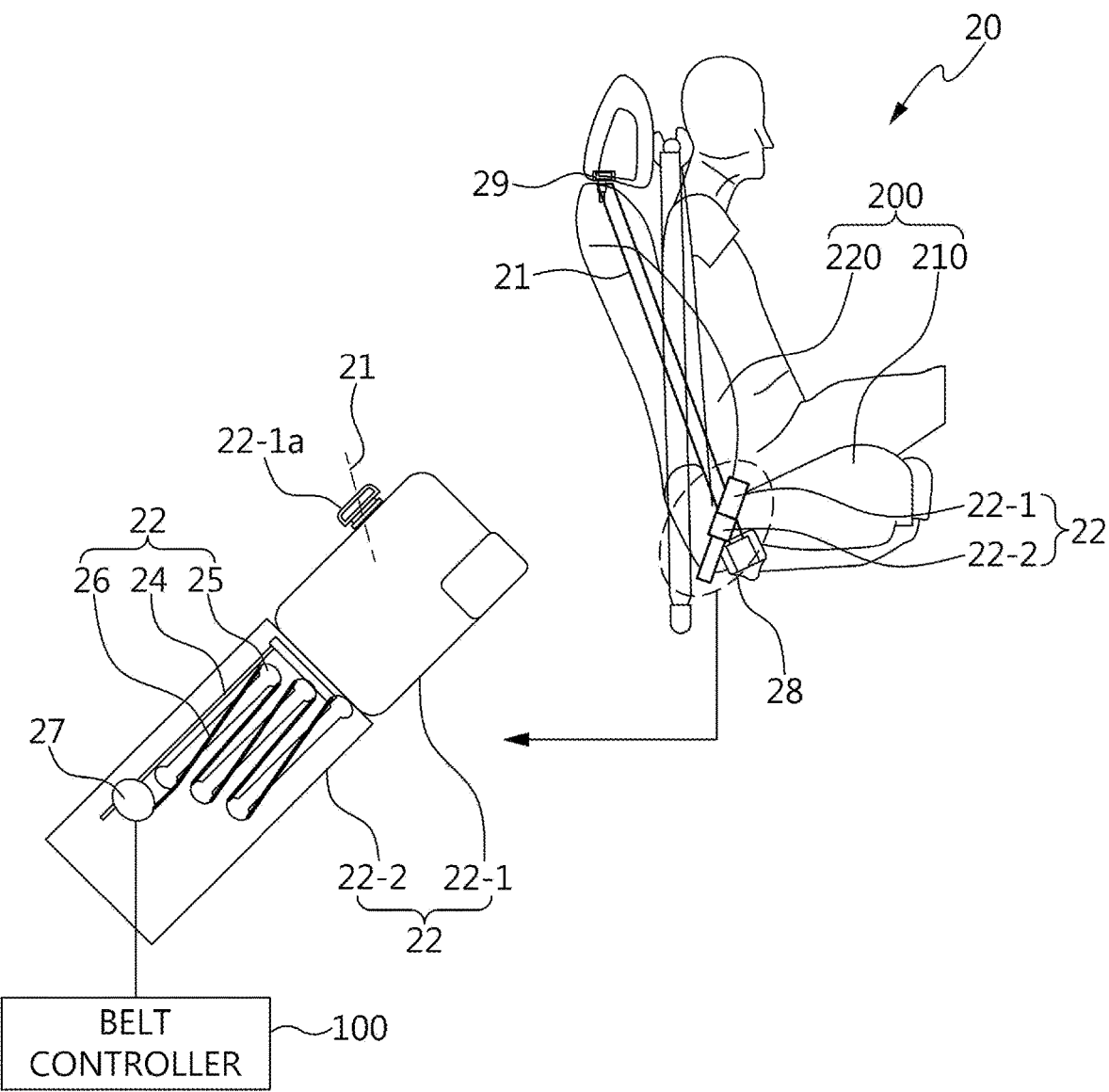
FIG. 3 is a block diagram of a motorized seat belt constituting the advanced four-point seat belt in one form of the present disclosure.

Referring to FIG. 3, the motorized seat belt 20 includes a webbing 21, a four-point belt switching device 22, a retractor 28, and a swiveling upper anchor 29.

For example, the webbing 21 diagonally holds the chest region from a right side of the passenger 1-1. The webbing 11 is formed in a strip made of a fabric and is wound around the retractor 18. The retractor 28 winds the withdrawn webbing 21 by a spring restoring force. Therefore, the webbing 21 and the retractor 28 are identical to the webbing 11 and the retractor 18 of the three-point seat belt 10.

For example, when the four-point belt switching device 22 is located adjacent to the retractor 28 at a portion of a side surface of a seat cushion 210 of a seat 200 and the moving buckle 22-1 engaged with the tongue 13 of the three-point seat belt 10 is in a downward moved state, the four-point belt switching device 22 moves upward toward the passenger 1-1 when a collision occurs to allow the webbing 21 to diagonally hold the chest region of the passenger 1-1 from the right side thereof.

To this end, the four-point belt switching device 22 includes the moving buckle 22-1 and a telescopic guider 22-2.

Specifically, in a state in which the moving buckle 22-1 is fixed due to insertion of the tongue 13 of the three-point seat belt 10 into the moving buckle 22-1, the moving buckle 22-1 is separated due to a button press operation so that the moving buckle 22-1 is a component that is identical to a conventional buckle. However, there is a difference in that the moving buckle 22-1 has a web ring 22-1a for hanging and supporting the webbing 21 while allowing the webbing 21 to pass through a side surface of the web ring 22-1a, and an upward movement or a downward movement is generated by the telescopic guider 22-2.

Specifically, the telescopic guider 22-2 includes a frame 23, a wire 26, and a motor 27. In particular, the frame 23 forms a frame group with a plurality of frames (i.e., first to sixth frames 23a, 23b, 23c, 23d, 23e, and 23f of FIG. 4) so as to be unfolded due to a reciprocal movement in a state of being superposed to each other.

The frame 23 includes a bracket 24 for allow the moving buckle 22-1 to move by a reciprocal movement in a wound direction of the wire 26 while forming a frame, and a roller shaft 25 for reducing or minimizing a frictional force so as to allow the bracket 24 is smoothly reciprocated.

The wire 26 is wound in a rotational direction of the motor 27 to allow the bracket 24 to be reciprocated in a direction opposite to the wound direction of the wire 26.

The motor 27 is rotated in forward and reverse directions under the control of the belt controller 100. When the motor 27 is rotated in the forward direction, the motor 27 winds the wire 26 in a wire release direction such that the bracket 24 is unfolded so as to allow the moving buckle 22-1 to move upward toward the passenger 1-1. On the other hand, when the motor 27 is rotated in the reverse direction, the motor 27 winds the wire 26 in a wire winding direction such that the bracket 24 is folded so as to allow the moving buckle 22-1 to move downward below the passenger 1-1. In particular, the motor 27 is provided with a wire winding portion on a rotating shaft to wind or release the wire 26 according to the rotational direction. In this case, the motor 27 may be a stepping motor.

Thus, the telescopic guider 22-2 forms an "X" shape (or form) webbing confinement state of the webbing 11 or 21 to the passenger 1-1 by a telescopic movement due to the unfolding or folding of the bracket 24.

For example, the swiveling upper anchor 29 has a bracket to be engaged with a backrest 220 via bolts or pins on the side surface of the seat 200. The swiveling upper anchor 29 has a ring for hanging and supporting the webbing 21 while allowing the webbing 21 to pass through the ring. In particular, when the ring is brought into contact with the webbing 21 due to withdrawal or insertion movements of the webbing 21, the ring is automatically swiveled to not confine the movement of the webbing 21. Therefore, the ring may be formed in a coupling structure to which a bracket, a pin, and a rotating joint are applied.

Figure 4:
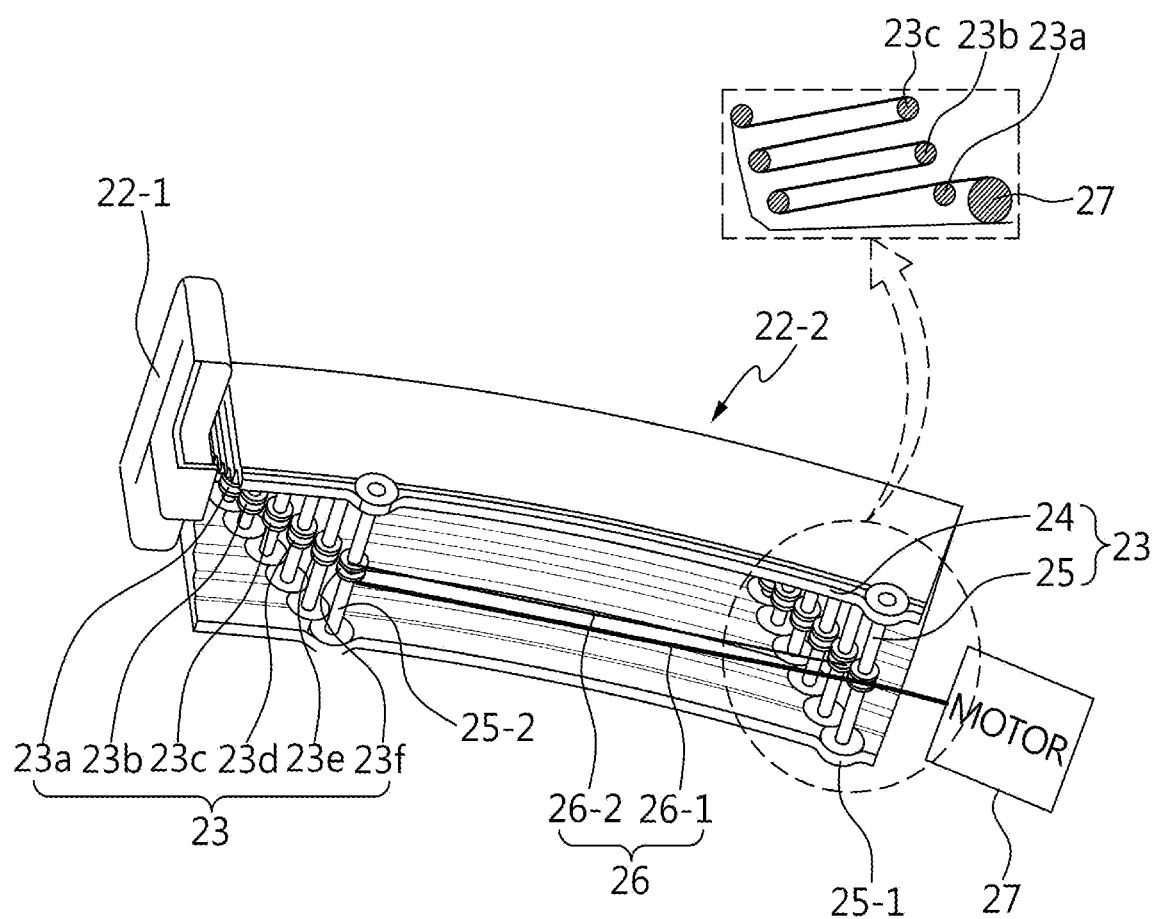
FIG. 4 is a block diagram of a four-point belt switching device applied to the motorized seat belt in one form of the present disclosure.

Referring to FIG. 4, the frame 23 is composed of a plurality of frames to form a superimposed state in a usual state in which a collision risk is absent.

In this case, the number of frames 23 is determined so as to allow the webbing 11 of the three-point seat belt 10 and the webbing 21 of the motorized seat belt 20 to form the "X" shape (or form) webbing confinement state at a central portion of the body of the passenger 1-1.

For example, the number of frames 23 may be six such as the first to sixth frames 23a to 23f. However, the number of the first to sixth frames 23a to 23f may be decreased or increased so as to meet the need for improving a holding force or convenience.

Specifically, each of the first frame 23a, the second frame 23b, the third frame 23c, the fourth frame 23d, the fifth frame 23e and the sixth frame 23f includes the bracket 24 to which the roller shaft 25 is coupled.

Therefore, the number of each of the roller shaft 25 and the wire 26 are provided according to the number of the first to sixth frames 23a to 23f.

Specifically, six roller shafts 25, each having a front roller shaft 25-1 and a rear roller shaft 25-2, are provided to smoothly guide a reciprocating movement due to a telescopic movement of the superposed first to sixth frames 23a to 23f.

The front roller shaft 25-1 is coupled to a front position of each of the superposed first to sixth frames 23a to 23f. The rear roller shaft 25-2 is coupled to a rear position of each of the superposed first to sixth frames 23a to 23f. In particular, a roller coupled to both sides of each of the front roller shaft 25-1 and the rear roller shaft 25-2 is freely rotated.

Specifically, the wire 26 is composed of an unfolding wire 26-1 and a folding wire 26-2 and is connected to each of six front roller shafts 25-1 and six rear roller shafts 25-2.

Consequently, when the motor 27 rotates in the forward direction, the unfolding wire 26-1 is released whereas the folding wire 26-2 is wound such that the moving buckle 22-1 may move upward. On the other hand, when the motor 27 rotates in the reverse direction, the unfolding wire 26-1 is wound whereas the folding wire 26-2 is released such that the moving buckle 22-1 may move downward.

Figure 5:
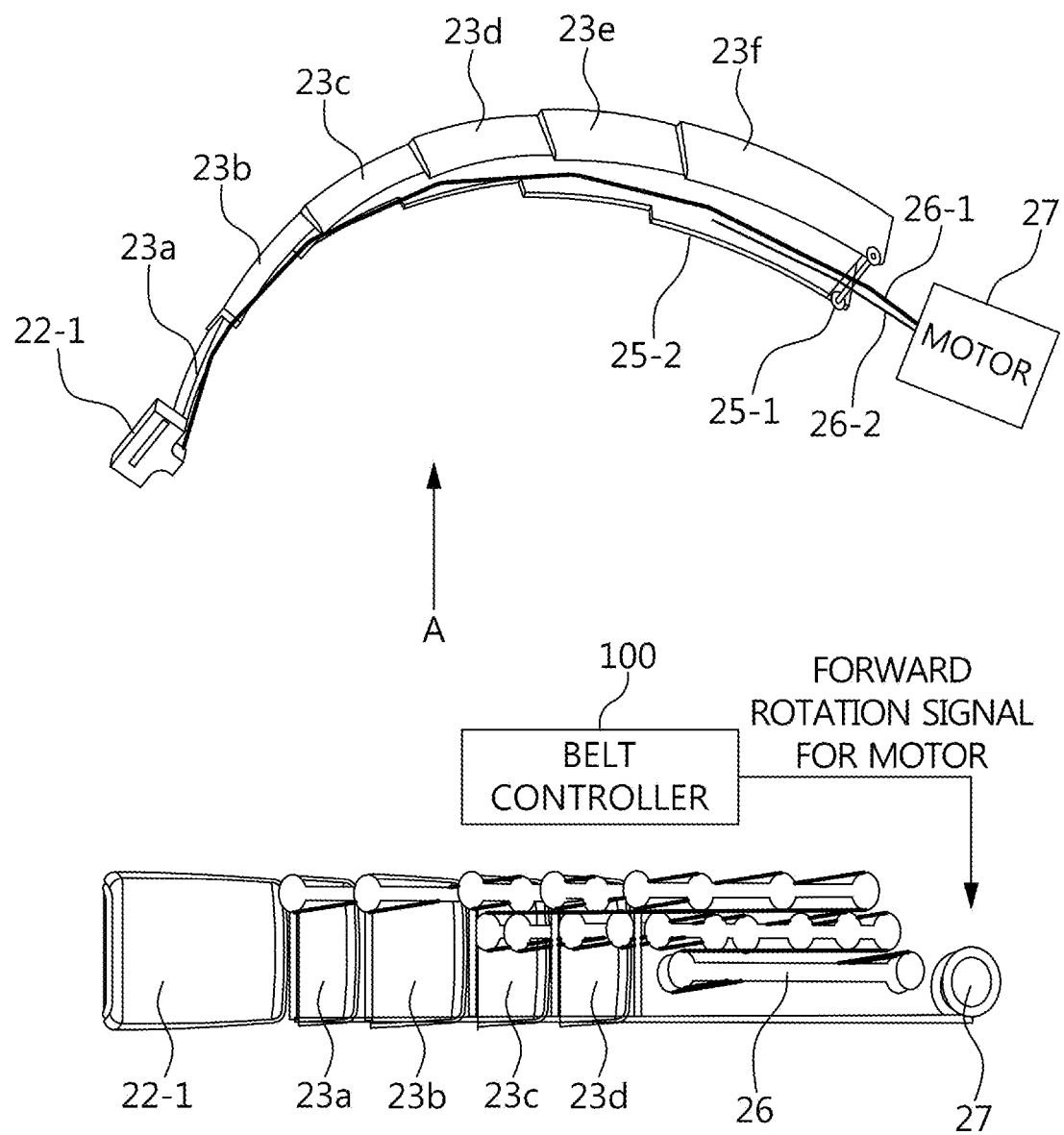
FIG. 5 is a diagram illustrating a telescopic stretching operation of the four-point belt switching device in one form of the present disclosure.
Figure 6:
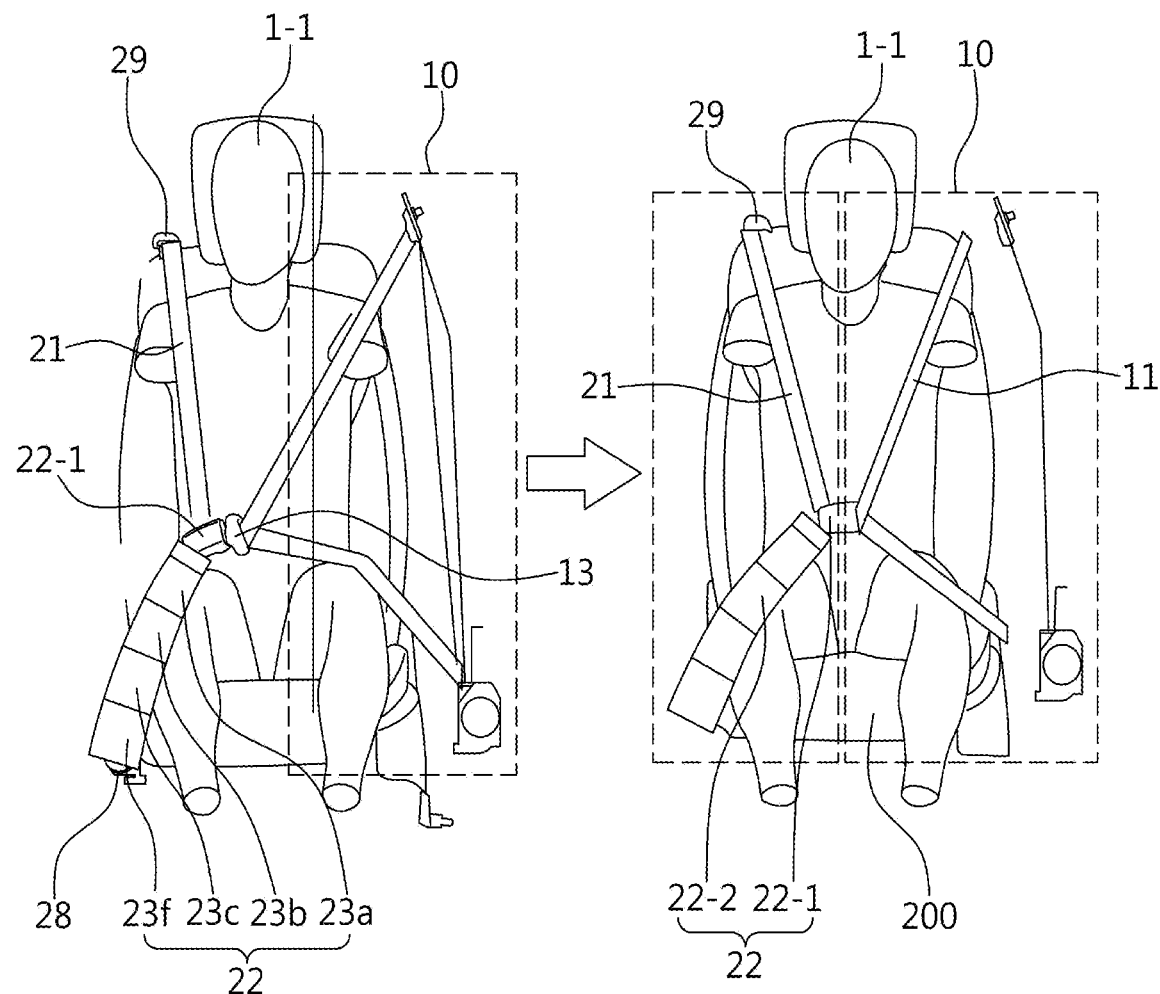
FIG. 6 is a diagram illustrating an example of an "X"-shape (or form) webbing confinement state by a telescopic stretching operation of the four-point belt switching device in one form of the present disclosure.

Meanwhile, FIGS. 5 and 6 illustrate an operation state of the telescopic guider 22-2 which allows the webbing 11 of the three-point seat belt 10 and the webbing 21 of the motorized seat belt 20 to form the "X" shape (or form) webbing confinement state in a situation in which a collision risk is present.

Referring to FIG. 5, when the belt controller 100 receiving a signal from the airbag controller 100-1, which recognizes a vehicle collision situation before a collision occurs, transmits a forward rotation signal to the motor 27, a telescopic deployment state of the first to sixth frames 23a to 23f is illustrated.

As shown in the drawing, the unfolding wire 26-1 is hanged on the front and rear roller shafts 25-1 and 25-2 and, when the motor 27 rotates in the forward direction, the unfolding wire 26-1 is wound around the rotating shaft of the motor 27 in the wire release direction whereas the folding wire 26-2 is wound around the rotating shaft of the motor 27 in the wire winding direction.

Therefore, in the first to sixth frames 23a to 23f in a state of being superposed to each other, the fifth frame 23e is released from the sixth frame 23f via the front and rear roller shafts 25-1 and 25-2 through a mutually opposite action of the unfolding wire 26-1 and the folding wire 26-2 due to the forward rotation of the motor 27, the fourth frame 23d is released from the fifth frame 23e at a position at which the fifth frame 23e is maximally deployed (i.e., released), and the third frame 23c, the second frame 23b, and the first frame 23a are sequentially released from corresponding frames.

Referring to FIG. 6, an upward movement of the moving buckle 22-1 due to a telescopic unfolding operation of the first to sixth frames 23a to 23f is illustrated.

As shown in the drawing, in a state in which the tongue 13 of the three-point seat belt 10 is connected, the moving buckle 22-1 moves upward toward the passenger 1-1 such that the webbing 21 withdrawn from the retractor 28 also moves upward. Then, the webbing 21 is withdrawn from the retractor 28 without any confinement on a movement due to an automatic swiveling generated from the ring constituting the swiveling upper anchor 29.

Consequently, the moving buckle 22-1 which moved upward is located at the central portion of the body of the passenger 1-1 such that the webbing 11 of the three-point seat belt 10 and the webbing 21 of the motorized seat belt 20 are switched to the "X" shape (or form) webbing confinement state.

Figure 7:
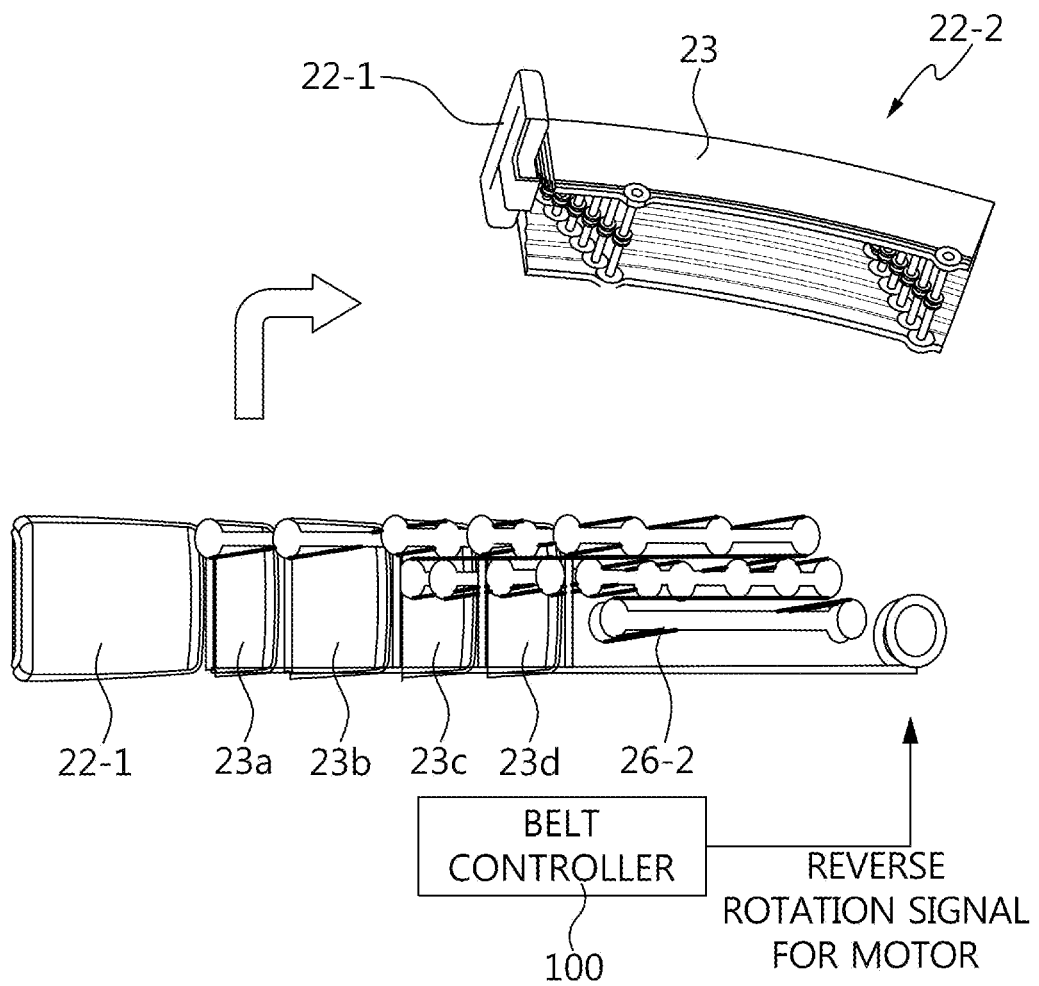
FIG. 7 is a diagram illustrating a telescopic insertion operation of the four-point belt switching device in one form of the present disclosure.
Figure 8:
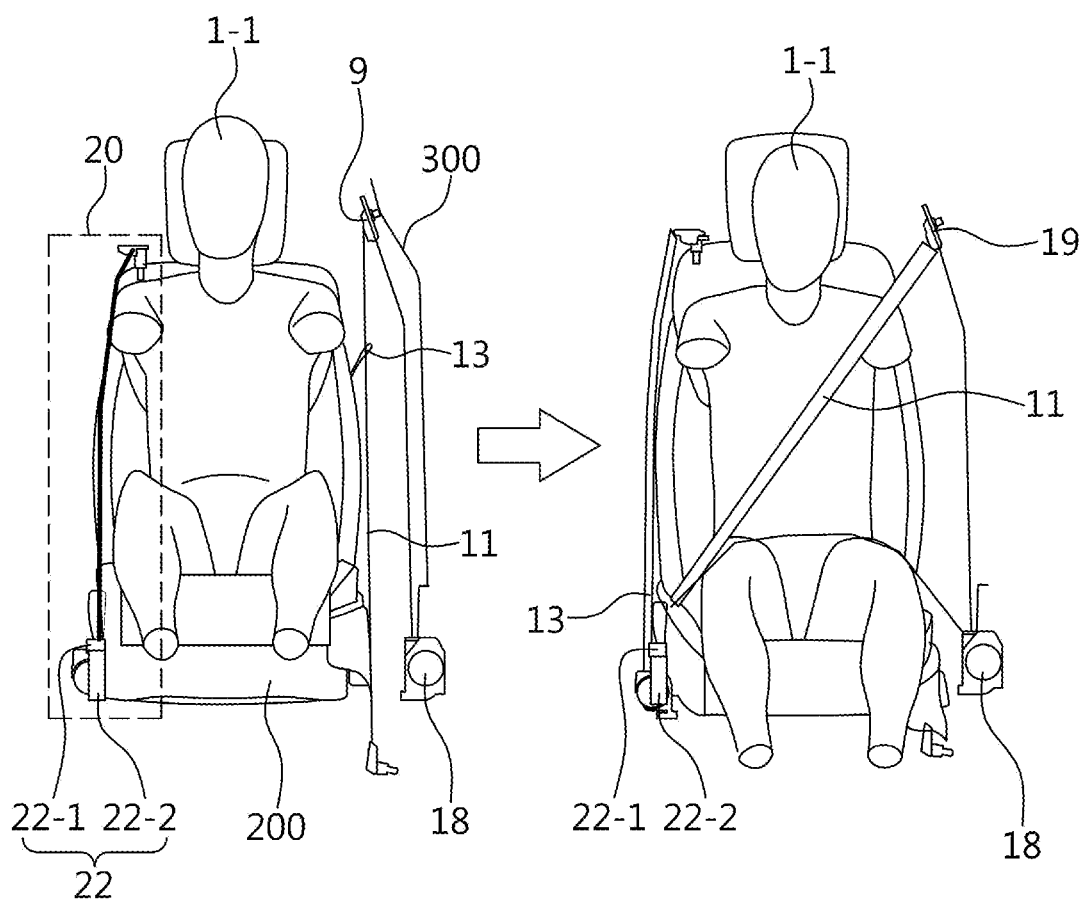
FIG. 8 is a diagram illustrating an example of releasing the "X" shape (or form) webbing confinement state by the telescopic insertion operation of the four-point belt switching device in one form of the present disclosure.

Meanwhile, FIGS. 7 and 8 illustrate a state in which of a return operation of the telescopic guider 22-2 for returning the webbing 21 of the motorized seat belt 20 to its initial position so as to release the "X" shape (or form) webbing confinement state.

Referring to FIG. 7, when the belt controller 100 receiving a signal from the airbag controller 100-1, which recognizes a vehicle collision release situation, transmits a reverse rotation signal to the motor 27, a telescopic retraction state of the first to sixth frames 23a to 23f is illustrated.

As shown in the drawing, the unfolding wire 26-1 is hanged on the front and rear roller shafts 25-1 and 25-2 and, when the motor 27 rotates in the reverse direction, the unfolding wire 26-1 is wound around the rotating shaft of the motor 27 in the wire winding direction whereas the folding wire 26-2 is wound around the rotating shaft of the motor 27 in the wire release direction.

Therefore, in the first to sixth frames 23a to 23f in a state of being unfolded to each other, the first frame 23a is superposed with the second frame 23b via the front and rear roller shafts 25-1 and 25-2 through the mutually opposite action of the unfolding wire 26-1 and the folding wire 26-2 due to the reverse rotation of the motor 27, the second frame 23b is superposed with the third frame 23c at a position at which the second frame 23b is maximally retracted (i.e., returned), and the third frame 23c, the fourth frame 23d, and the fifth frame 23e are sequentially superposed with the sixth frame 23f.

Referring to FIG. 8, a downward movement of the moving buckle 22-1 due to a telescopic retraction operation of the first to sixth frames 23a to 23f is illustrated.

As shown in the drawing, in the state in which the tongue 13 of the three-point seat belt 10 is connected, the moving buckle 22-1 moves downward below the passenger 1-1 such that the webbing 21 is wound around the retractor 28. Then, the webbing 21 is wound around the retractor 28 without any confinement on a movement due to an automatic swiveling generated from the ring constituting the swiveling upper anchor 29.

Consequently, the holding force due to the webbing 21 of the motorized seat belt 20 moving downward toward the seat 200 is released by the moving buckle 22-1 such that the passenger 1-1 is held by the webbing 11 of the three-point seat belt 10 instead of the "X" shape (or form) webbing confinement state.

As described above, the advanced four-point seat belt 1 includes the three-point seat belt 10 having the webbing 11 for diagonally holding the passenger 1-1 and the motorized seat belt 20 for withdrawing the webbing 11 and the webbing 21 to switch to the "X" shape confinement state by locating the tongue 13 of the webbing 11 to the central portion of the body of the passenger 1-1 when a vehicle collision situation is recognized, and the advanced four-point seat belt 1 is provided on the side surface of the seat 200 such that collision safety regulations of NCAP (North America), ECE R-16 (Europe), and FMVSS 208, 209 (USA) can be fulfilled, and particularly, in switching in engagement from a three-point seat belt to a four-point seat belt is achieved by a buckle movement due to motor power immediately before a collision such that an additional engagement operation of a user is not required.

The advanced four-point seat belt applied to a vehicle of the present disclosure implements the following actions and effects.

First, a four-point seat belt can be provided, and the four-point seat belt can be worn with one hand at a time as required in collision safety regulations of each country with North America at the head. Second, since switching to the four-point seat belt is be achieved by a motor immediately before a collision after a user performs a three-point engagement operation at one time, the collision safety regulations can be satisfied. Third, it is possible to distribute a shoulder load degrading a chest displacement through engagement of the four-point seat belt, thereby significantly reducing an injury caused by belt compression while effectively improving holding of a passenger. Fourth, since the four-point seat belt is in conjunction with the existing two-point or three-point seat belt, it is possible to minimize an increase of a production cost without inconvenience to the passenger use. Fifth, the four-point seat belt optimized for protection of a passenger in an autonomous vehicle allowing the passenger to select various posture modes such as a "relax mode," "working mode," and "lounge mode" can be provided.

Although the foregoing description has been described with a focus on novel features of the present disclosure as being applied to various forms, those skilled in the art will be appreciated that various deletions, substitutions, and alterations can be made from the forms and details of the above-described apparatus and method without departing from the scope of the present disclosure. Accordingly, the scope of the present disclosure is defined by the appended claims rather than the foregoing description. All variations equivalent to the scope of the appended claims will fall within the scope of the present disclosure.

While the present disclosure has been described with respect to the specific forms, it will be apparent to those skilled in the art that various changes and modifications may be made without departing from the spirit and scope of the present disclosure. Accordingly, it should be noted that such alternations or modifications fall within the claims of the present disclosure, and the scope of the present disclosure should be construed on the basis of the appended claims.

What is claimed is:

1. An advanced four-point seat belt, comprising:
    a three-point seat belt configured to diagonally hold a passenger with a webbing; and
    a motorized seat belt configured to allow a tongue of the webbing to maintain a state of being fixed to a side surface of a seat cushion to an initial position,
    wherein when a vehicle collision situation is recognized, the motorized seat belt is configured to form an "X" shape webbing confinement state by withdrawing the webbing and another webbing to locate the tongue at a central position of a body of the passenger.

2. The advanced four-point seat belt of claim 1, wherein:
    the motorized seat belt is controlled by a belt controller; and
    the belt controller recognizes the vehicle collision situation in conjunction with an airbag controller.

3. The advanced four-point seat belt of claim 1, wherein, in the three-point seat belt, a support anchor configured to support the webbing is engaged with a vehicle body panel.

4. The advanced four-point seat belt of claim 1, wherein the motorized seat belt includes:

in a state in which the tongue is connected, a four-point belt switching device configured to withdraw the webbing to allow the tongue to be located at the central portion of the body of the passenger;
a retractor configured to wind the webbing; and
a swiveling upper anchor configured to support the webbing.

5. The advanced four-point seat belt of claim 4, wherein the retractor is fixed to a lower portion of the seat.

6. The advanced four-point seat belt of claim 4, wherein the swiveling upper anchor is fixed to an upper portion of the seat.

7. The advanced four-point seat belt of claim 6, wherein the swiveling upper anchor generates a rotation so as to not confine a movement due to a withdrawal or insertion of the webbing.

8. The advanced four-point seat belt of claim 4, wherein the four-point belt switching device includes:
a moving buckle connected to the tongue; and
a telescopic guider configured to generate a telescopic movement for allowing the moving buckle to move upward or downward with respect to the passenger.

9. The advanced four-point seat belt of claim 8, wherein a web ring configured to support the webbing of the motorized seat belt is provided at the moving buckle.

10. The advanced four-point seat belt of claim 8, wherein the telescopic guider includes:
a frame configured to convert the telescopic movement into a reciprocal movement;
a wire configured to generate the reciprocal movement of the frame by being wound or released; and
a motor configured to form the winding and the release of the wire in a rotational direction.

11. The advanced four-point seat belt of claim 10, wherein a roller shaft is provided at the frame to reduce friction due to the reciprocal movement.

12. The advanced four-point seat belt of claim 10, wherein the frame includes a frame group constituted of a plurality of frames so as to be unfolded in the reciprocal movement in a state of being superposed on each other.

13. The advanced four-point seat belt of claim 10, wherein:
the wire includes an unfolding wire and a folding wire; and
when the motor rotates, the unfolding wire and the folding wire are respectively released and wound in opposite directions.

14. A vehicle comprising:
an advanced four-point seat belt,
wherein the advanced four-point seat belt includes:
a three-point seat belt having a webbing configured to diagonally hold a passenger; and
when a vehicle collision situation is recognized, a motorized seat belt configured to withdraw the webbing and another webbing to switch to an "X" shape webbing confinement state by locating a tongue of the webbing located below the passenger to a central portion of a body of the passenger.

15. The vehicle of claim 14, wherein the three-point seat belt is located in a direction opposite to the motorized seat belt from a vehicle body panel side.

16. The vehicle of claim 14, wherein the motorized seat belt is provided at a position of a seat opposite to the three-point seat belt.

17. The vehicle of claim 16, wherein the motorized seat belt is provided on a side surface of the seat.

18. The vehicle of claim 14, wherein the motorized seat belt is controlled by a belt controller to be switched to the "X" shape webbing confinement state.

19. The vehicle of claim 18, wherein the belt controller is configured to receive a recognition signal for the vehicle collision situation from an airbag controller and to operate the motorized seat belt.

* * * * *